(12) United States Patent
Tadatsu

(10) Patent No.: US 6,654,063 B1
(45) Date of Patent: Nov. 25, 2003

(54) IMAGE INVERTING DEVICE

(75) Inventor: Takashi Tadatsu, Koga (JP)

(73) Assignee: Loyal Port Company Limited, Koga (JP)

( * ) Notice: Subject to any disclaimer, the term of this patent is extended or adjusted under 35 U.S.C. 154(b) by 0 days.

(21) Appl. No.: 09/365,181

(22) Filed: Aug. 2, 1999

(30) Foreign Application Priority Data

Jul. 31, 1998 (JP) .......................................... 10-218236

(51) Int. Cl.$^7$ ........................... H04N 7/00; H04N 5/225
(52) U.S. Cl. .................................... 348/373; 348/36
(58) Field of Search ................................ 348/373, 374, 348/205, 203, 199, 335, 340, 36, 37

(56) References Cited

U.S. PATENT DOCUMENTS

| | | | | |
|---|---|---|---|---|
| 5,022,723 A | * | 6/1991 | Schnidt et al. ................. | 348/36 |
| 5,097,325 A | * | 3/1992 | Dill .............................. | 348/36 |
| 5,721,585 A | * | 2/1998 | Keast et al. ................... | 348/37 |
| 5,760,826 A | * | 6/1998 | Nayar .......................... | 348/36 |
| 5,790,181 A | * | 8/1998 | Chahl et al. .................. | 348/36 |
| 6,005,682 A | * | 12/1999 | Wu et al. ..................... | 358/474 |
| 6,034,716 A | * | 3/2000 | Whiting et al. ............... | 348/36 |
| 6,144,406 A | * | 11/2000 | Girard et al. ................. | 348/373 |

* cited by examiner

*Primary Examiner*—Aung S. Moe
*Assistant Examiner*—Rashawn N. Tillery
(74) *Attorney, Agent, or Firm*—Kanesaka & Takeuchi

(57) ABSTRACT

An image inverting device includes an objective mirror which reflects an image light, incident on a rotation axis from a side of the rotation axis, in the direction of the rotation axis, and an inverting unit on which the image light reflected by the objective mirror is incident. The inverting unit is formed of an assembly of an odd number of reflecting mirrors or an optical block having an odd number of reflecting surfaces. The inverting unit reflects the image light such that the light rotates around the rotation axis due to rotation of the unit, and emits the image light in the direction of the rotation axis. A rotation drive device is attached to rotate the objective mirror and the inverting unit respectively around the rotation axis in the same direction such that their respective angular velocities are in a ratio of 2:1.

11 Claims, 12 Drawing Sheets

IMAGE INVERTING DEVICE

BACKGROUND OF THE INVENTION

1. Field of the Invention

This invention relates to an image inverting device, and in particular to an image inverting device having a function to stop the rotation of an image acquired as it moves round, and suitably employed on a rotating imaging device.

2. Description of the Related Art

Monitoring devices using television cameras are in wide use. FIG. 17 shows an installation of such a television camera, wherein, for example, a mounting stand 1 is attached to the underside of a ceiling, and a television camera 2 is installed on the mounting stand 1. A cable 3 is pulled out from the television camera 2.

FIG. 18 shows an example wherein the television camera 2 is fitted to a pole 4. Herein, the television camera 2 is attached to the upper end of the pole 4 on a rotation stand 5, and is covered by a case 6. In this arrangement, the television camera 2 can be rotated through a predetermined angle.

In order to acquire a wide image of the surroundings, the television camera 2 may be rotated through a large rotation angle around the mounting stand 1 or rotation stand 5 on which the television camera 2 is fitted. However as the cable 3 connected to the television camera 2 becomes twisted, there is a limit to the rotation angle and there is therefore a problem in that television camera 2 cannot be rotated through any desired angle in any desired direction.

It may be possible to use a slip ring or the like to avoid using the connecting cable 3 which limits the rotation of the television camera 2. However, in the case of a slip ring, noise tends to arise from the sliding contact, and there is a problem in that the apparatus cannot be made compact. Another method has been proposed wherein signal transfer is performed using radio communication, but such a method has many disadvantages such as battery life, leaking of information over the radio, decline of image quality due to radio bandwidth limitations, and intermixture of radio noise.

The television camera 2 may also be rotated directly without using the connecting cable, but this has the disadvantage of requiring a large space. That is, when monitoring is performed by the television camera, it is installed so that the axis of the television camera is aligned in an effectively horizontal direction. If it is made to rotate in such a state, a large space is required to rotate the television camera 2, and this is therefore unsuitable for imaging in a confined space.

OBJECTS AND SUMMARY OF THE INVENTION

An object of this invention is to resolve the above problems, to provide an image inverting device wherein, although the image is acquired while the device moves round, the image does not rotate, and to provide a rotating imaging device which can acquire a rotation image with no limitation without rotating the image receiving means itself.

Another object of this invention is to provide a device, wherein rotation of the image is stopped and a non-rotating image can be obtained.

A further object of this invention is to provide a device, wherein 360 degree rotation imaging can be performed without rotating the image receiving means, and the image does not rotate in this process.

According to one aspect of this invention, there is provided an image inverting device comprising:

an objective mirror which reflects an image light, incident on a rotation axis from the side of the rotation axis, in the direction of the rotation axis, an inverting unit on which the image light reflected by the objective mirror is incident, which reflects the image light such that the light rotates around the rotation axis due to the rotation of this unit, and which emits the image light in the direction of the rotation axis, and rotation drive means for rotating the objective mirror and the inverting unit respectively so that a predetermined relation exists between them.

The objective mirror and inverting unit may be respectively rotated in the same direction around the rotation axis such that the ratio of their angular velocities is 2:1. The inverting unit may comprise an assembly of an odd number of reflecting mirrors. The inverting unit may also comprise an optical block comprising an odd number of reflecting surfaces. The inverting unit may also comprise a Dove prism.

Another invention relates to a image inverting device comprising:

an image inverting device, and an image receiving means disposed so that its optical axis coincides with the rotation axis of the inverting device for receiving the image light emitted by the inverting unit.

The image receiving means may be a television camera or a video camera. The image receiving means may comprise a focussing lens which focuses the image light emerging from the inverting unit to an image, and a linear image receiving means which is disposed at the focal point of the focussing lens and extends in a perpendicular direction to the direction in which the image moves when the objective mirror rotates. Also, reading from the linear image receiving means may take place in synchronism with the rotation of the objective mirror.

The above and other objects, features and advantages of this invention will be apparent from the following description of illustrative embodiments, which are to be read in connection with accompanying drawings.

DETAILED DESCRIPTION OF THE PREFERRED EMBODIMENTS

Figure 1:
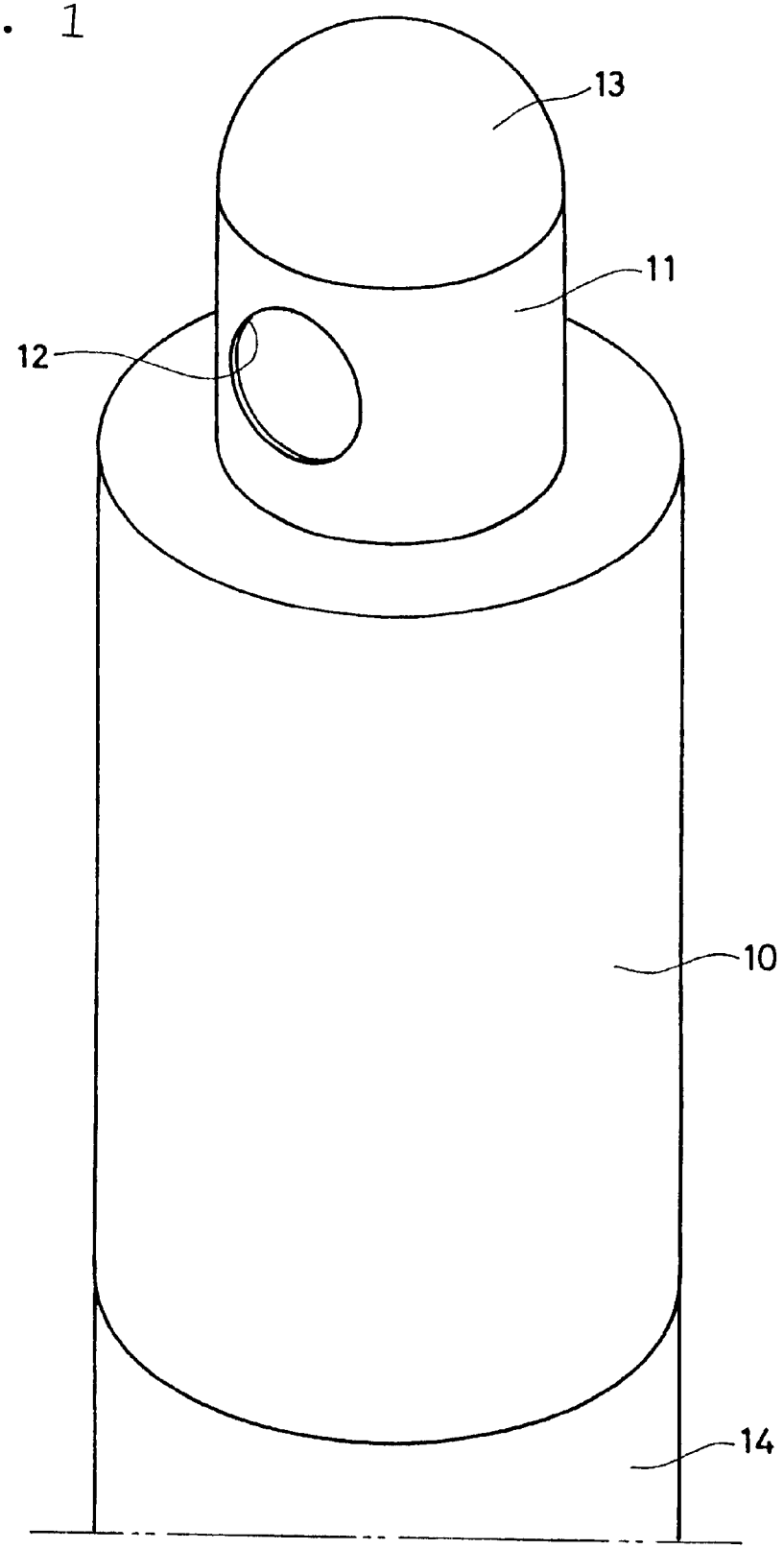
FIG. 1 is a perspective view of an essential part of a rotating imaging device.

FIG. 1 shows a rotating image receiving device to which the image inverting device according to a first embodiment of this invention is applied, and which comprises a case 10 for housing the image inverting device. A rotating sleeve 11 is attached to the upper part of this case 10 such that it is free to rotate. This rotating sleeve 11 comprises a circular window 12 which takes in image light from the side. A cap 13 is attached to the upper part of the rotating sleeve 11, and a camera case 14 is disposed below the above-mentioned case 10.

Figure 2:
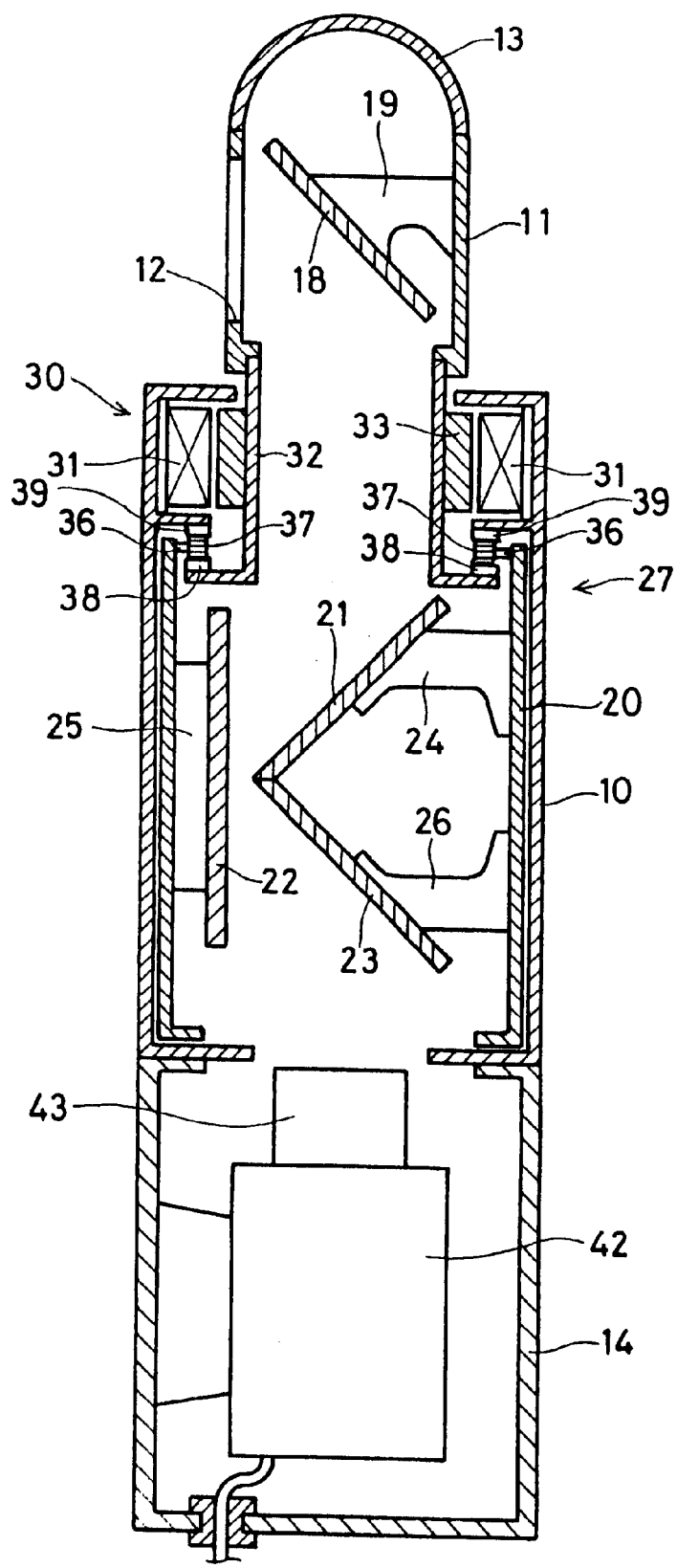
FIG. 2 is a longitudinal sectional view of essential parts of the device.

FIG. 2 shows the internal structure Of this rotating imaging device. An objective mirror 18 is attached inside the aforesaid circular sleeve 11 via an arm 19, and the image acquired through the circular window 12 is reflected by this objective mirror 18.

A rotating frame 20 is disposed free to rotate inside and concentric with the case 10. Three reflecting mirrors 21, 22, 23 are respectively attached inside this rotating frame via mounting brackets 24, 25, 26. An inverting unit 27 is formed by the three reflecting mirrors 21, 22, 23.

A motor 30 is disposed on the upper edge of the case 10 and in the upper part of the rotating frame 20. This motor 30 has a hollow ring shape, and comprises a stator coil 31 attached to the inner circumferential surface of the case 10, and a rotor magnet 33 attached to the outer circumference of a rotor 32 formed from a cylinder attached to the rotating sleeve 11. The stator coil 31 and rotor magnet 33 face each other via an air gap.

If the stator coil 31 is energized, the rotor magnet 33 will receive a force in an inner circumferential direction, and the rotor 32 will rotate. Due to the rotation of the rotor 32, the rotating sleeve 11 is rotated.

Next, a planetary gear mechanism disposed below the motor 30 will be described. Plural pivot shafts 36 are fixed in a radial direction on the upper edge of the rotating frame 20, and a planetary gear 37 is attached by such a pivot shaft 36 so that it is free to rotate. This planetary gear 37 engages with a sun gear 38 attached to the outer circumference of the rotor 32, and engages with a ring-shaped end gear 39 fixed to the inner circumferential surface of the case 10.

Therefore, when the motor 30 is driven, the sleeve 11 comprising the rotor 32 and the objective mirror 18 is rotated, and the rotating frame 20 is rotated at one half of the angular velocity of the rotor 32 due to the differential mechanism comprising the above-mentioned planetary gear mechanism.

Next, the television camera 42 is arranged in the case 14. This television camera 42 is disposed so that its optical axis coincides with the rotation center, i.e., rotation axis, of the aforesaid rotating frame 20, its barrel 43 on the front end side being oriented upward.

Figure 3:
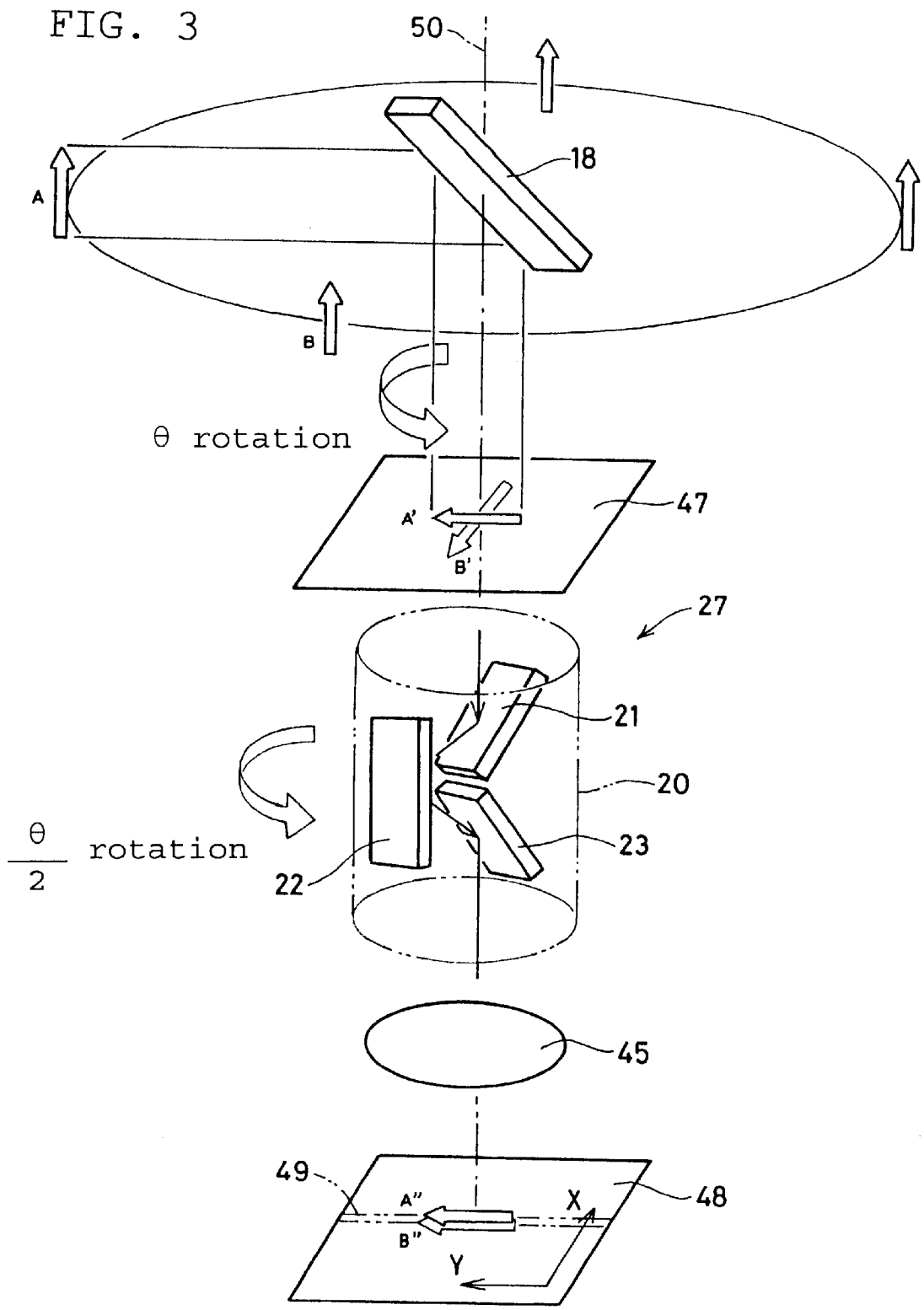
FIG. 3 is a perspective view of an optical stystem showing the principle of a rotating imaging device.

FIG. 3 shows the principle of, in particular, the image inverting device of this rotating image receiving device. Image light which is incident from the side of a rotation axis 50 is reflected downwards by the objective mirror 18. The image is then inverted by the inverting unit 27, and an image which does not rotate is formed on an image receiving surface 48. A focusing lens 45 is disposed below the inverting unit 27 to focus the image on this imaging surface 48. When the television camera 42 is employed, this lens 45 comprises an optical lens used in the barrel of the television camera 42.

The principle of forming the stationary image on the image receiving surface 48 by the optical system shown in FIG. 3, will now be described. This optical system comprises the objective mirror 18 which reflects image light incident from the side of the rotation axis 50 in the direction of the rotation axis 50, and the inverting unit 27 which, when the image light rotates around the rotation axis 50, rotates the emergent light around the rotation axis by the same angle in the reverse direction. The reflected light from the objective mirror 18 is arranged to be incident on the inverting unit 27, and the objective mirror 18 and inverting unit 27 are rotated in the same direction such that their respective angular velocities are in a ratio of 2:1. The rotation with the aforesaid angular velocity ratio is produced by the motor 30 shown in FIG. 2 and the planetary gear mechanism disposed below this motor 30.

The three mirrors 21, 22, 23 which comprise the inverting unit 27 are fixed to each other so that their positional relationship is determined. The inverting unit 27 which comprises the reflecting mirrors 21, 22, 23 is disposed so that the incident light and emergent light are in the same straight line. The inverting unit 27 comprises an odd number of reflecting surfaces. Although the three mirrors 21, 22, 23 are used herein, this number is not limiting and any number of mirrors, e.g., five or seven, may be used.

Now, if a clock is reflected on the mirror, the rotation direction of the hands are reversed. This is referred to as inversion of optical axis rotation. If this phenomenon is applied to the three mirrors 21, 22, 23 and the incident light is rotated by $\theta$ around the rotation axis 50, an inversion of $-\theta$ occurs due to the first reflecting mirror 21, a rotation of $\theta$ occurs due to the second reflecting mirror 22, and a rotation of $-\theta$ occurs due to the third reflecting mirror 23.

Herein, consider the three mirrors 21, 22, 23 wherein the positions are determined relative to each other form one system, and let this system be the inverting unit 27. If this inverting unit 27 is rotated by $\omega$ in the same direction as the incident light which rotates by $\theta$ around the straight line with which the incident light and emergent light are aligned, i.e., around the rotation axis 50, the rotations of the various light beams are as follows.

Incident light: $\theta$
Reflected light from mirror 21: $-\theta+\omega$
Reflected light from mirror 22: $-(-\theta+\omega)=\theta-\omega$
Reflected light from mirror 23: $-(-(-\theta+\omega))+\omega=\theta+2\omega$.

As the second mirror 22 reflects the reflected light from the first mirror 21, and the reflected light is led to the mirror 23, there is no relative motion in the rotation direction on the incidence side or emergence side. That is, the positional relationship or orientation of the reflecting mirrors 21, 23 does not vary whatever the rotation position of the second reflecting mirror 22 relative to the rotation axis 50, so there is no need to consider the effect of $\omega$ for the mirror 22.

Now, if $\omega=\theta/2$, the rotation of the emergent light emerging from the reflecting mirror 23 is $-\theta+2\omega=-\theta+2(\theta/2)=0$. That is, if the inverting unit 27 is rotated at an angular velocity which is half the angular velocity of the incident light, the emergent light will stop rotating. This is the principle by which a non-rotating image is formed on the image receiving surface 48.

The above description assumes that the optical axis also rotates by $\omega$ when the inverting unit 27 rotates by $\omega$, this principle being the same-as the principle of rotation of the optical axis due to the objective mirror 18. That is, when the objective mirror 18 rotates around the rotation axis 50 in FIG. 3, the vertical direction and the horizontal direction of the objective mirror 18 respectively coincide with the vertical direction and horizontal direction of the object being imaged, and this is always the same regardless of the rotation angle. However, images A', B', which are formed by projecting the images reflected by the objective mirror 18 on a projecting surface 47, rotate together with the rotation of the objective mirror 18 by the same angle around the rotation axis 50 on the projecting surface 47. In this case also, the images on the projecting surface 47 do not rotate relative to each other due to their relation to the objective mirror 18.

Hence, when the reflected light from the objective mirror 18 is made to be incident on the inverting unit 27 as it is, and the inverting unit 27 is rotated by $\theta/2$, the light emerging from the inversion unit 27 is brought to an image on the image receiving surface 48 by the focussing lens 45. This image on the image receiving surface 48 does not rotate, and is always oriented in the same direction.

Therefore, if the television camera 42 is installed below the inverting unit 27 as shown in FIG. 2, a full 360 degree panorama can be obtained merely by rotating the objective mirror 18 and inverting unit 27, respectively, while the television camera 42 remains fixed. Consequently, the arrangement shown in FIG. 2 forms a rotating imaging device.

Figure 4:
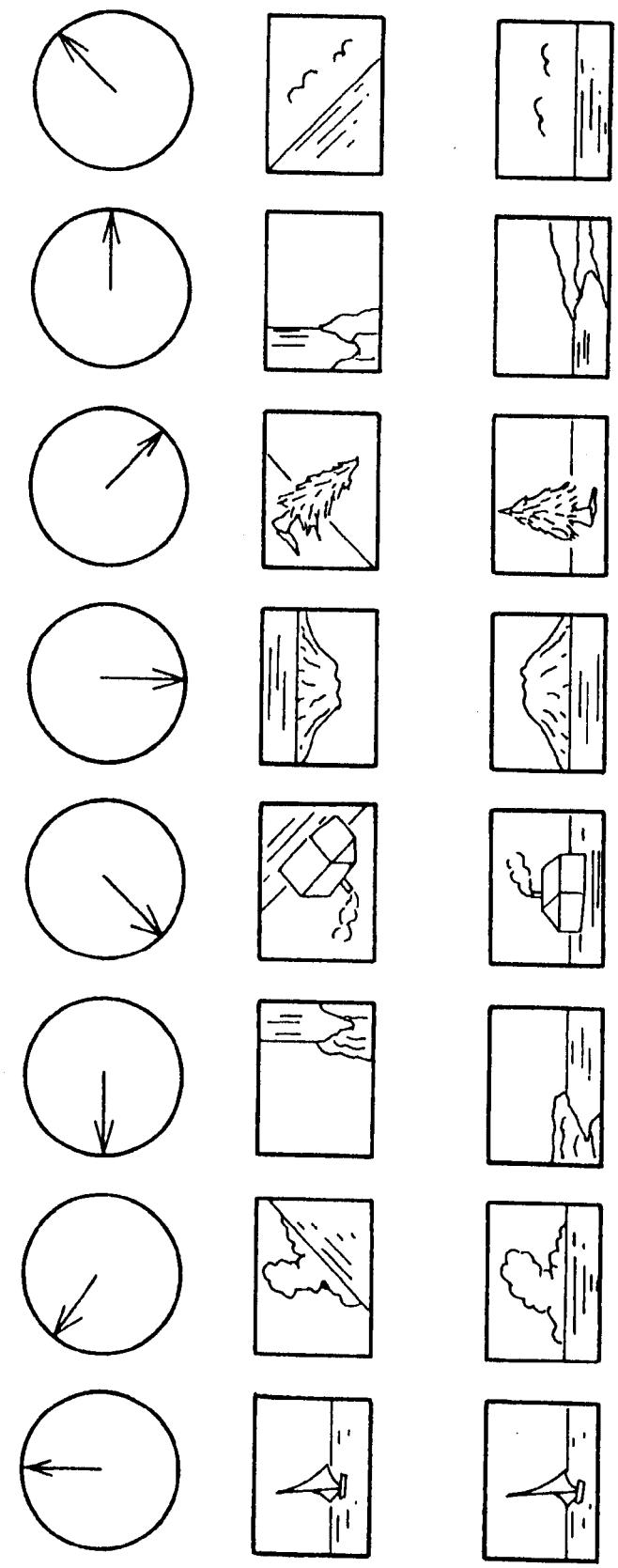
FIG. 4 is a plan view showing an acquired image.

FIG. 4 shows an image acquired by such a rotating imaging device. That is, as is clearly evident from the lower row of FIG. 4, an image is obtained wherein the direction of a horizontal line is always oriented sideways for every rotation position. On the other hand, the image obtained from a combination of the video camera 42 and the objective mirror 18 is shown in the upper row in FIG. 4. In the case of this image, the horizontal line rotates on the monitor, and the image obtained is very hard to see.

Thus, according to the rotation imaging device of this embodiment, a panorama of 360 degrees can be obtained as shown by the lower row in FIG. 4. Moreover, as the television camera 42 can be fixed with the case 14 shown in FIG. 2 without rotating the television camera 42 around the rotation axis 50, the cable does not twist and break. Also, as the television camera 42 is disposed with its optical axis oriented upwards in the case 14, space can be considerably reduced as compared with the prior art.

In the optical system shown in FIG. 3, when the objective mirror 18 is rotated around the rotation axis 50, the image formed on the image receiving surface 48 does not rotate around the rotation axis 50, but it shifts in the X axis direction on the image receiving surface 48. Therefore, using this property, a linear scan may be performed using a linear imaging element 49.

That is, the linear imaging element 49 comprising a linear optical sensor is aligned such that its light-receiving surface is parallel to the Y axis direction of the imaging surface 48. If the signal from the imaging element 49 is read at a rate which is synchronized with the rotational speed of the objective mirror 18, a two-dimensional image can be obtained without using an imaging element having plane surface, for example an area CCD. In general, the function of the signal light reading part of a linear CCD comprising a linear imaging element is based on exactly the same principle as that of a common scanner. The important point is that what is referred to as scanning with an ordinary scanner is here achieved by rotating the aforesaid rotating imaging device, i.e., the combination of the objective mirror 18 and the inverting unit 27, and the scanning rate is synchronized with this rotational speed.

In such a construction, the focusing lens 45 is required for forming the image on this linear imaging element 49 in the optical path from the object to the imaging element 49. The focusing lens 45 may therefore be installed between the inverting unit 27 and the imaging element 49, but it is not absolutely necessary to install it in this position.

According to this construction wherein the focusing lens 45 is disposed below the inverting unit 27, the focusing lens 45 may be separated from the rotating system, and the structure of the image receiving part can be made very compact. Moreover, by using a linear CCD as the linear image receiving element 49, a clearer image will be obtained as the number of picture elements in one row is greater than with an area CCD.

Figure 5:
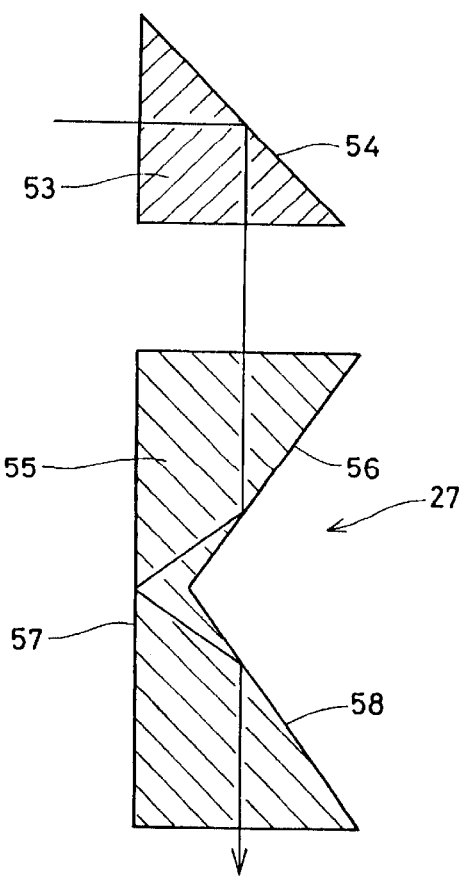
FIG. 5 is a longitudinal sectional view showing an optical system of another embodiment.

Next, another embodiment will be described referring to FIG. 5. This embodiment uses a glass block 53 having the shape of a right-angled isosceles triangle instead of the objective mirror 18, which reflects light from its reflecting surface 54. The image light is also reflected using the glass block 55 as the inverting unit 27, by an inclined reflecting surface 56, vertical reflecting surface 57 and inclined reflecting surface 58.

According to this construction wherein the inverting unit 27 is formed by the glass block 55, as the mutual positions of the three reflecting surfaces 56, 57, 58 are predetermined, they do not shift from their positions and from each other at a later time, and the function of the inverting unit 27 is properly maintained.

Figure 6:
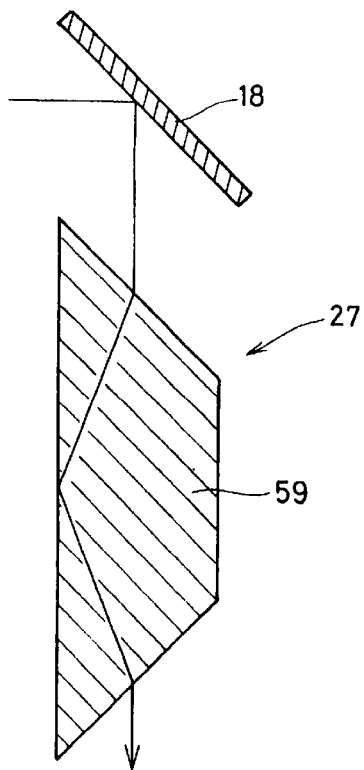
FIG. 6 is a longitudinal sectional view showing an optical system of yet another embodiment.

FIG. 6 shows yet another embodiment. In this embodiment, a Dove prism 59 is used as the inverting unit 27. Specifically, the image light reflected by the reflecting mirror 18 is caused to be incident on and is refracted by the upper inclined surface of the Dove prism 59, reflected by the perpendicular surface of this Dove prism 59, and refracted by the lower inclined surface of the Dove prism 59 whereupon it emerges.

Figure 7:
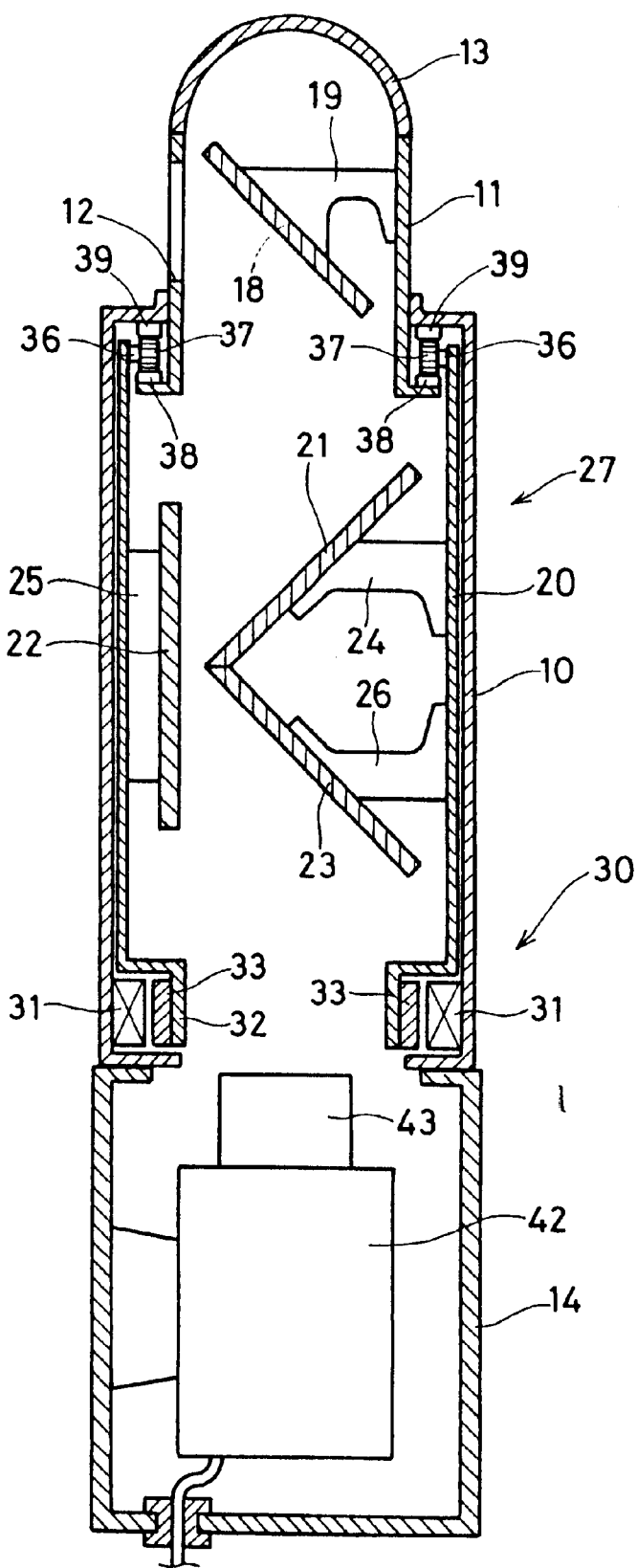
FIG. 7 is a longitudinal sectional view of essential parts of a rotating imaging device showing another drive mechanism.

FIG. 7 shows another construction for rotating the objective mirror 18 and inverting unit 27. Herein, the motor 30 is disposed in the lower part of the rotating frame 20 which is inside the case 10. The rotor yoke 32 is attached to the lower part of the rotating frame 20, and the rotor magnet 33 is fixed to the rotor yoke 32. The stator coil 31 is also provided so that it faces the rotor magnet 33. That is, the rotating frame 20 herein also uses the rotor of the motor. An ultrasonic motor may be used instead of an electromagnetic motor.

The pivot shaft 36 is fixed to a part on the upper edge of the rotating frame 20. The planetary gear 37 is supported on this pivot shaft 36 such that it is free to rotate, the planetary gear 37 being engaged respectively with the sun gear 38 provided on the outer circumference of the rotating sleeve 11 and the end gear 39 attached to the inner circumferential surface of the case 10, and the rotating sleeve 11 is thereby rotated at twice the rate of the rotating frame 20. Therefore, in this case the rotation speed of the motor 30 is ½ of that in the construction shown in FIG. 2.

Figure 8:
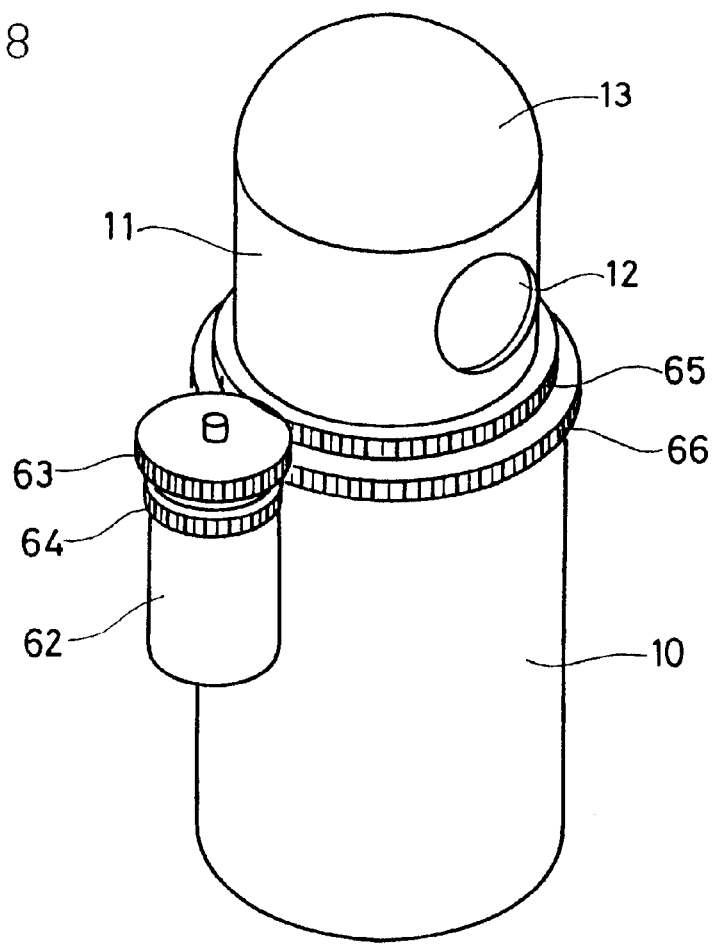
FIG. 8 is a perspective view of an essential part showing the rotating imaging device of yet another embodiment.
Figure 9:
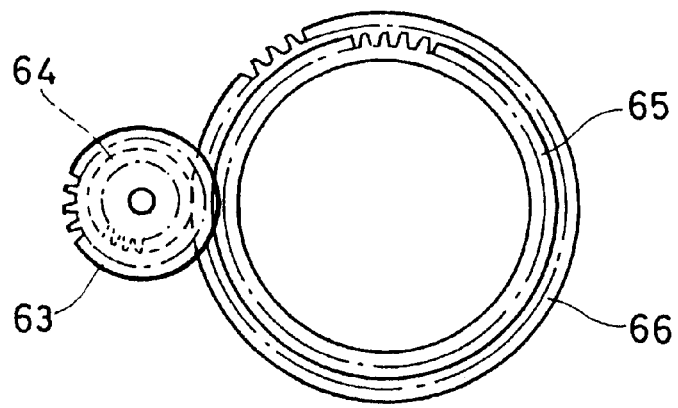
FIG. 9 is a plan view showing the engagement relationship of gears.

Next, yet another embodiment will be described referring to FIGS. 8 and 9. According to this embodiment, a geared motor 62 is attached to the outer circumference of the case 10, gears 63, 64 are fitted to the output shaft of this geared motor 62, and these gears 63, 64 are respectively made to engage with a gear 65 which drives the rotating sleeve 11 and a gear 66 which drives the rotating frame 20. Herein, if the numbers of teeth of the gears 63, 64, 65, 66 are set to a, c, b, d, and a/b=2c/d, the rotating sleeve 11 will rotate in the same direction as the rotating frame 20 at twice its rate of rotation.

Figure 10:
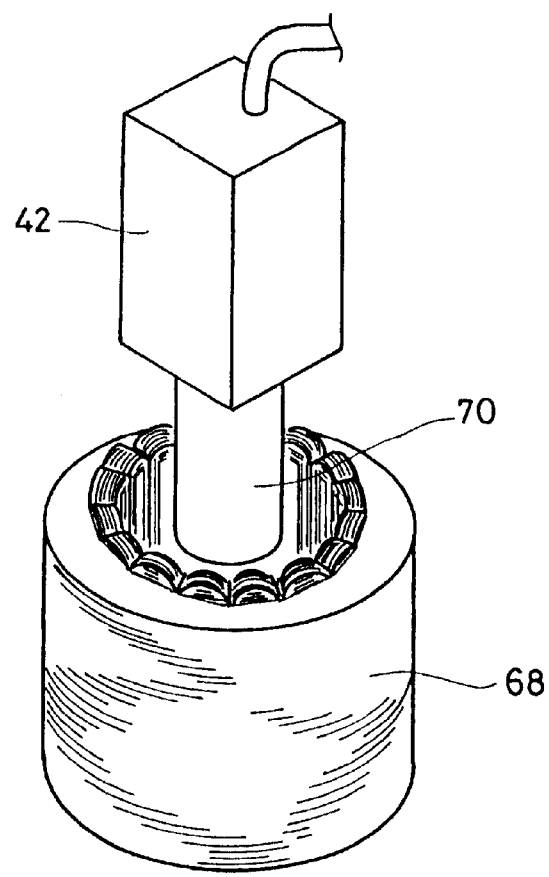
FIG. 10 is a perspective view showing an examination of the stator of an induction motor.
Figure 11:
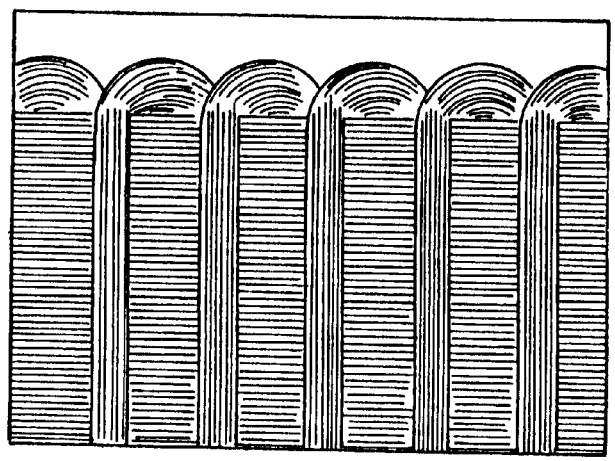
FIG. 11 is a front view showing the examination image obtained.

Next, some examples will be given of an application of such a rotating imaging device. FIGS. 10 and 11 show an example wherein it is used for examining the assembly of a stator 68 of a 3 phase induction motor, and is made to perform an examination of the windings of the stator coil provided on the inner circumferential surface of the stator. The above-mentioned image inverting device 70 is inserted into the stator 68 formed in the shape of a cylinder. FIG. 11 shows an image taken by such a device.

Figure 12:
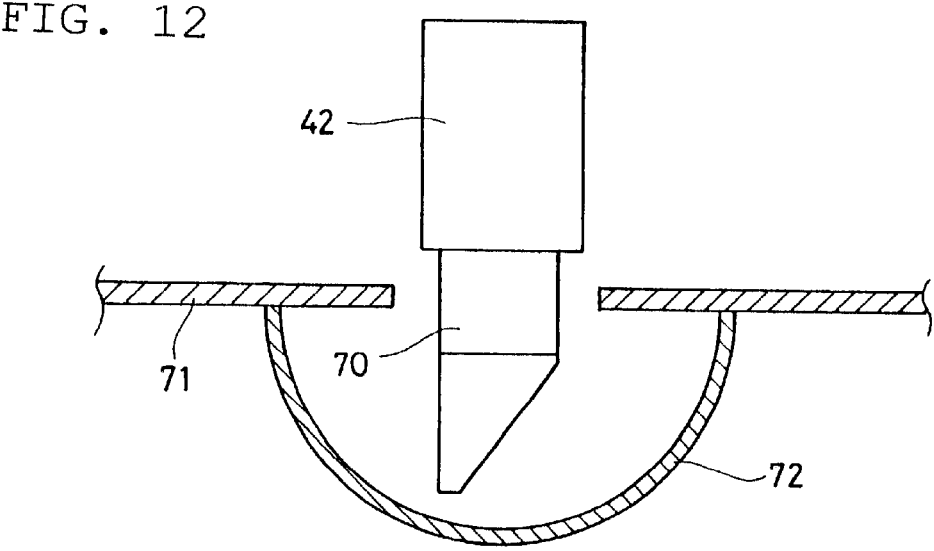
FIG. 12 is a longitudinal sectional view of a monitoring device attached to a ceiling.
Figure 13:
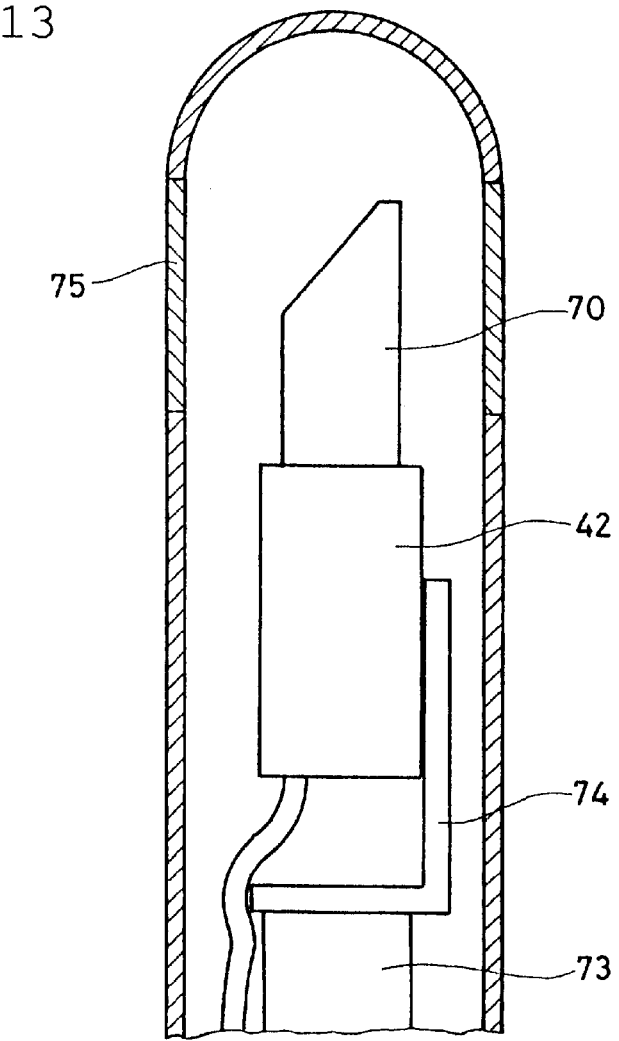
FIG. 13 is a longitudinal sectional view of a monitoring device attached to a pole.

FIG. 12 shows a monitoring apparatus using such a device, wherein the television camera 42 is fitted on a ceiling 71 and the image inverting device 70 is inserted through an aperture in the ceiling 71. This image inverting device 70 is covered by a transparent dome 72. In this construction, the monitoring device can be attached to the ceiling 71 almost without being noticed, and a 360 degree panorama can also be obtained In FIG. 13, the television camera 42 is attached to a pole 73 via a bracket 74, and the image inverting device 70 is attached to the barrel of the camera. Herein, the image inverting device 70 is housed in a sleeve 75. This sleeve 75 is a transparent sleeve and, for this reason, an image can be acquired over the entire circumference.

Figure 14:
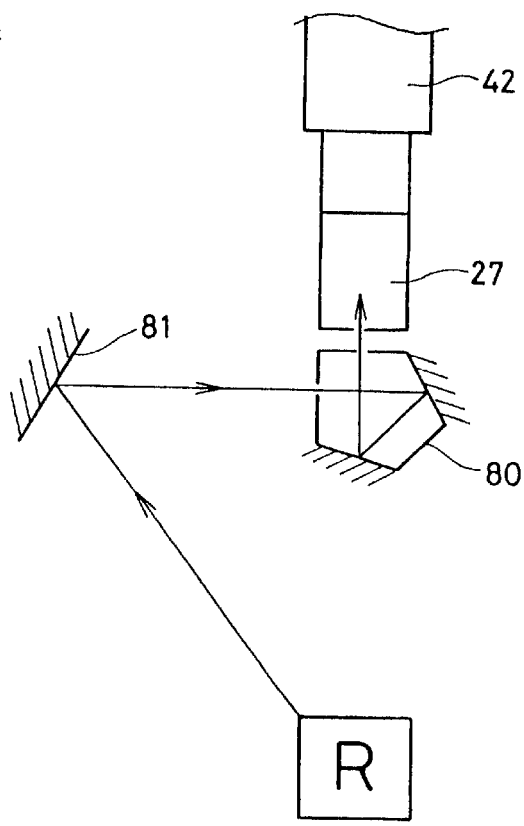
FIG. 14 is a front view showing an example of application to a panoramic observation device.

FIG. 14 shows an example of three-dimensional viewing device in which a small object is imaged by an optical device such as, for example, a microscope. A pentaprism 80 is provided on the tip side of the inverting unit 27, and a rotating mirror 81 is also provided. The pentaprism 80 and rotating mirror 81 are rotated with a fixed relationship to one another.

Figure 15:
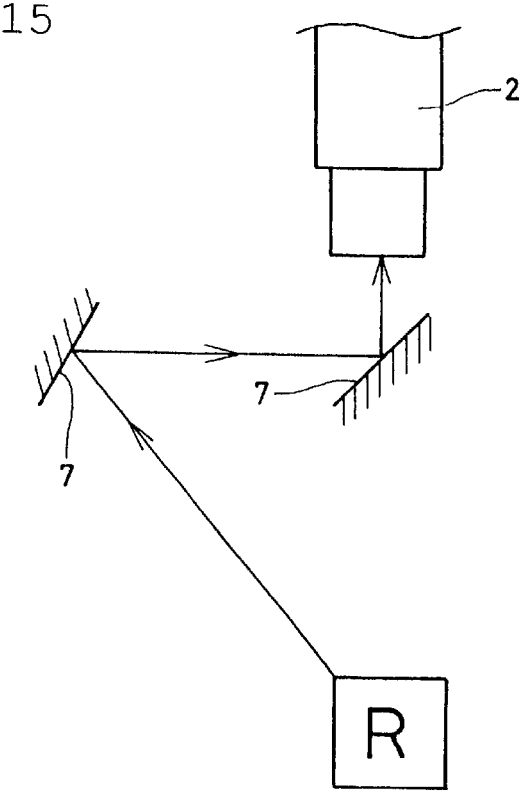
FIG. 15 is a front view of a prior art panoramic observation device.
Figure 16:
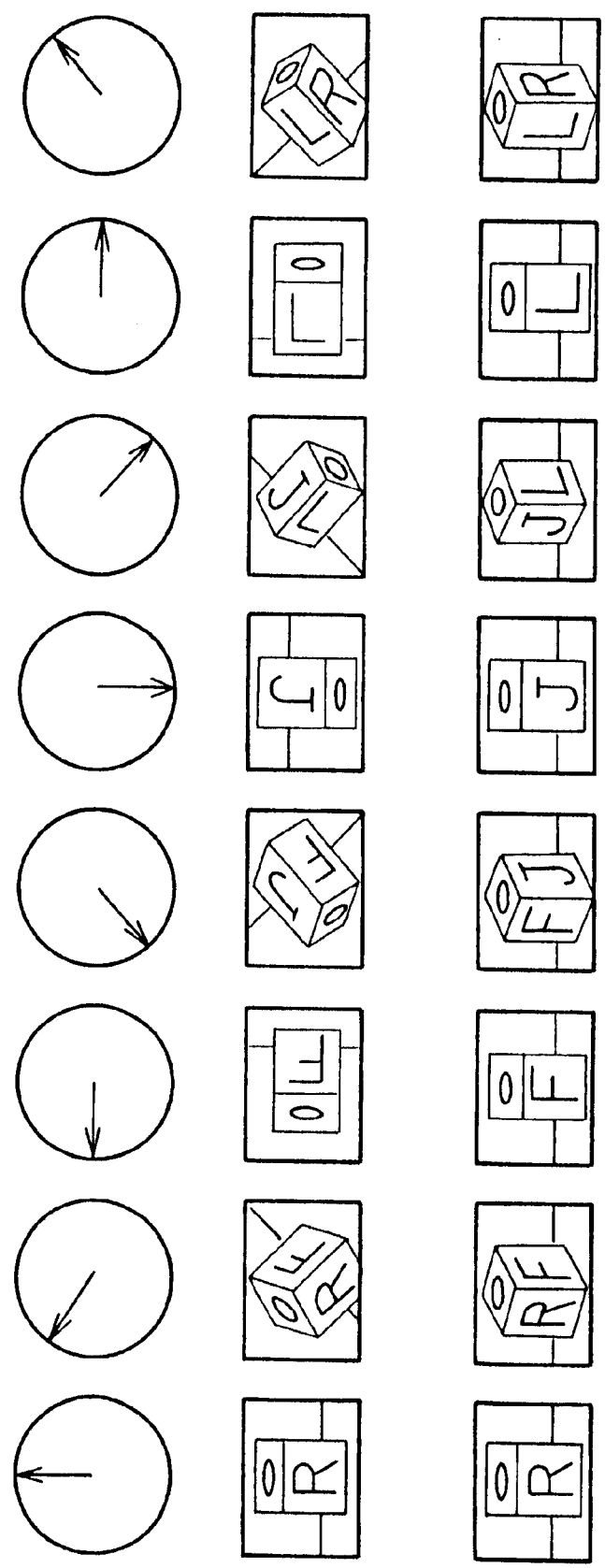
FIG. 16 is a plan view showing an image obtained by a panoramic observation device.
Figure 17:
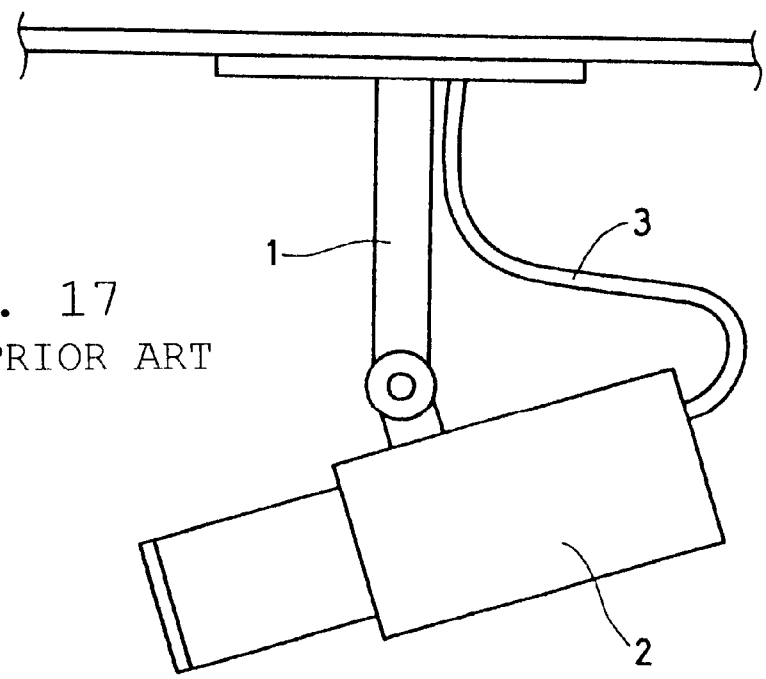
FIG. 17 is a side view showing a prior art monitor camera attached to a ceiling.
Figure 18:
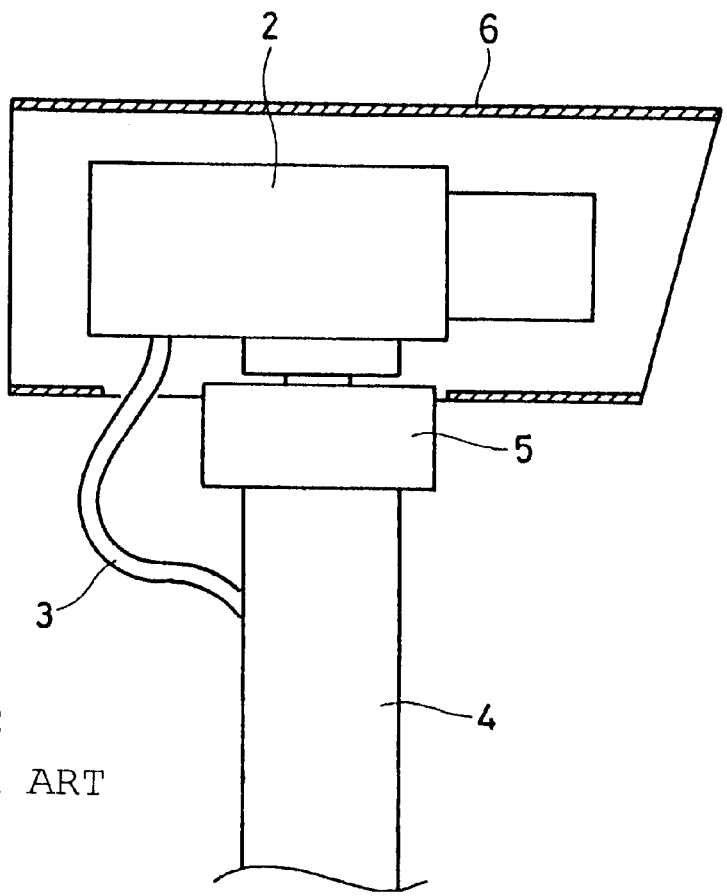
FIG. 18 is a side view showing a prior art monitor camera attached to a pole.

The lower row of FIG. 16 shows an image of an object acquired by such a device. The image shown in the upper row of FIG. 16 was acquired by the device shown in FIG. 15. Specifically, the image of the object was obtained by arranging the reflecting mirror 7 on the tip side of the television camera 2, and combining it with another reflecting mirror 7 which rotates together with former reflecting mirror 7. In this case, the image rotates and is very hard to see, but if the inverting unit 27 is attached as shown in FIG. 14, the image is no longer inverted and is easy to see.

Having described specific embodiments of this invention with reference to the accompanying drawings, it is to be understood that the invention is not limited to those precise embodiments, and that various changes and modifications may be made by one skilled in the art without departing from the scope or spirit of the invention as described in the appended claims.

What is claimed is:

1. An image inverting device comprising:

an objective mirror which reflects an image light, incident on a rotation axis from a side of the rotation axis, in a direction of said rotation axis, an inverting unit on which the image light reflected by said objective mirror is incident, said inverting unit being formed of an assembly of an odd number of reflecting mirrors or an optical block having an odd number of reflecting surfaces, said inverting unit reflecting said image light such that the light rotates around said rotation axis due to rotation of said unit, and emitting said image light in the direction of said rotation axis, and rotation drive means for rotating said objective mirror and said inverting unit respectively around said rotation axis in a same direction such that their respective angular velocities are in a ratio of 2:1.

2. An image inverting device as defined in claim 1, wherein said objective mirror comprises a combination of a pentaprism provided on a tip side of said inverting unit and a rotary mirror, which are rotated with a fixed relationship to one another for accomplishing a three dimensional viewing system.

3. An image inverting device as defined in claim 1, wherein said rotation drive means comprises a motor for driving said objective mirror, and a planetary gear mechanism for transmitting a torque of said motor to said inverting unit which is rotated at one half of the angular velocity of said objective mirror due to a differential motion of said planetary gear mechanism.

4. An image inverting device as defined in claim 1, wherein said rotation drive means comprises a motor for driving said inverting unit, and a planetary gear mechanism for transmitting a torque of said motor to said objective mirror which is rotated at twice the rate of said inverting unit due to a differential motion of said planetary gear mechanism.

5. An image inverting device as defined in claim 1, wherein said rotation drive means comprises a geared motor, and a first and second gear trains for driving said objective mirror and said inverting unit, a gear ratio of said first and second gear trains being such that said objective mirror rotates in the same direction as said inverting unit at twice its rate of rotation.

6. An image inverting device as defined in claim 1, further comprising: image receiving means disposed so that its optical axis coincides with the rotation axis of said inverting unit for receiving the image light emitted by said inverting unit.

7. An image inverting device as defined in claim 6, wherein said image receiving means is a television camera or a video camera.

8. An image inverting device as defined in claim 6, wherein said image receiving means comprises a focusing lens for focusing the image light emerging from said inverting unit to an image, and linear image receiving means disposed at a focal point of said focusing lens, and extending in a perpendicular direction to a direction in which said image moves when said objective mirror rotates.

9. An image inverting device as defined in claim 8, wherein reading from said linear image receiving means takes place in synchronism with rotation of said objective mirror.

10. An image inverting device as defined in claim 1, wherein said inverting device is connected to a television camera fitted on a ceiling, and said inverting device is inserted through an aperture in the ceiling and is covered by a transparent dome.

11. An image inverting device as defined in claim 1, wherein said inverting device is connected to a television camera, an optical axis of which is vertical and attached to a pole, and said inverting device is housed in a transparent sleeve.

* * * * *